Sept. 7, 1943.  E. G. BLACKLEDGE  2,328,605
HARVESTER
Original Filed Aug. 22, 1939   3 Sheets-Sheet 1
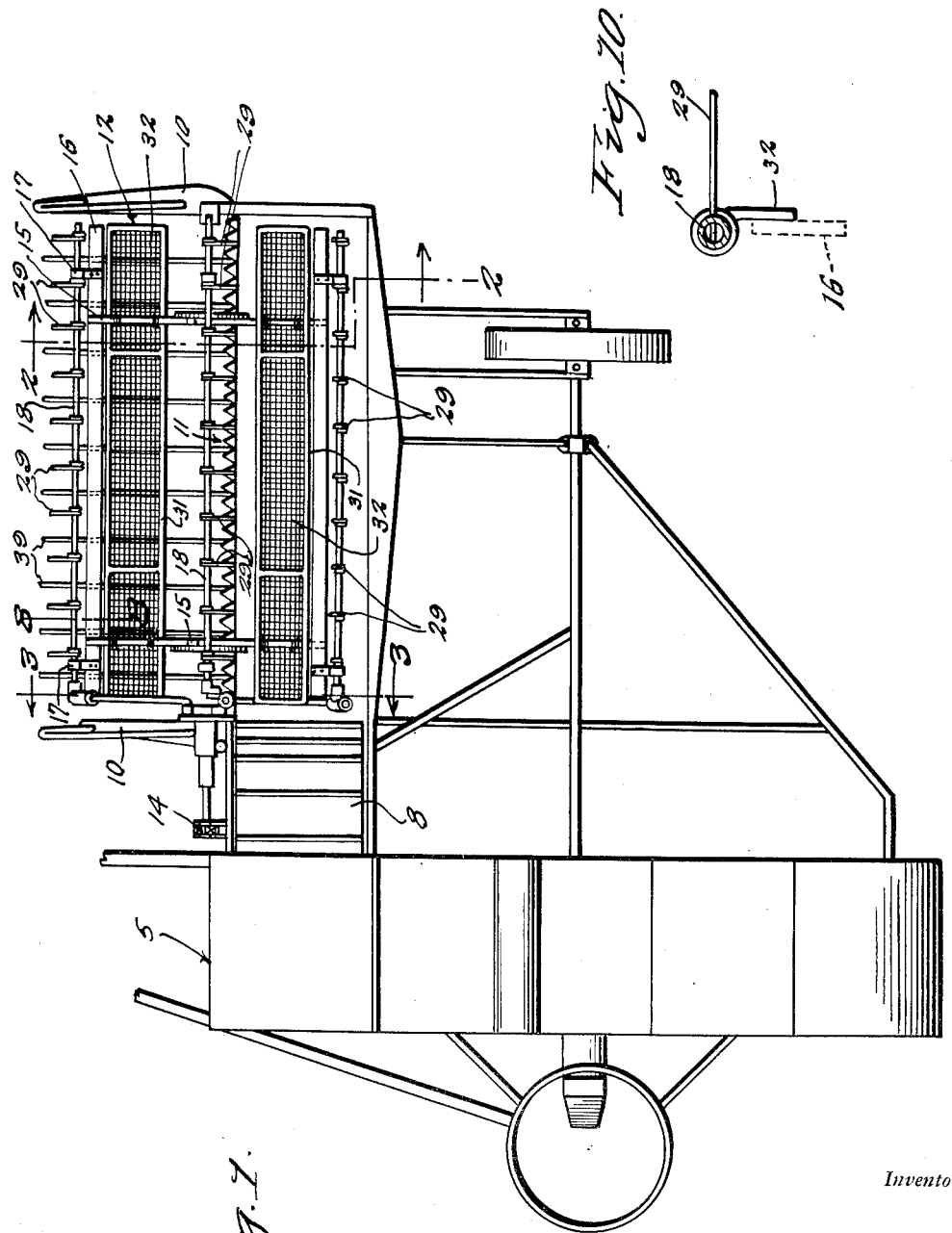
Inventor
Elmer G. Blackledge
By Clarence A. O'Brien
and Harvey B. Jacobson
Attorneys Sept. 7, 1943.  E. G. BLACKLEDGE  2,328,605
HARVESTER
Original Filed Aug. 22, 1939  3 Sheets-Sheet 2
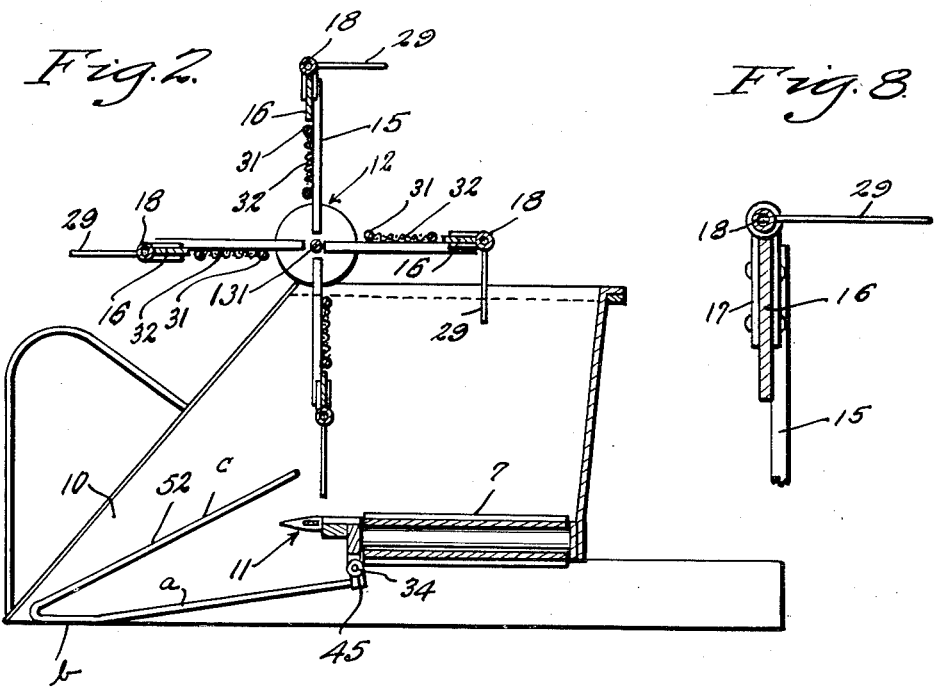
Inventor
Elmer G. Blackledge
By Clarence A. O'Brien
and Harvey B. Jacobson
Attorney Sept. 7, 1943.  E. G. BLACKLEDGE  2,328,605
HARVESTER
Original Filed Aug. 22, 1939  3 Sheets-Sheet 3
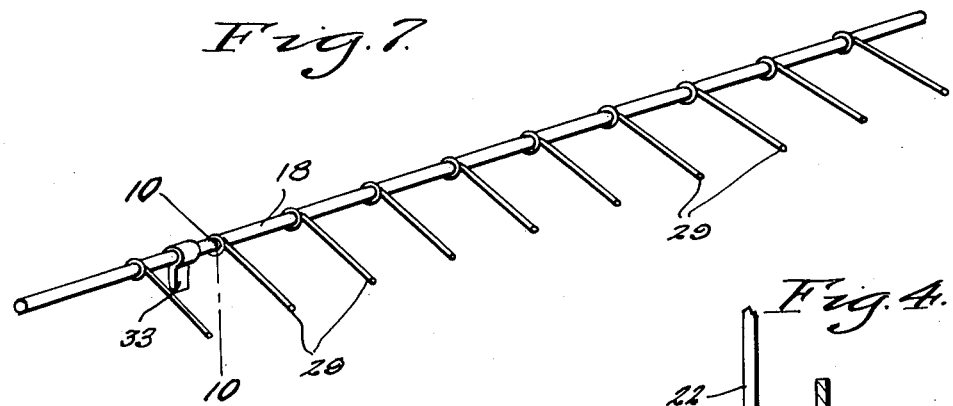
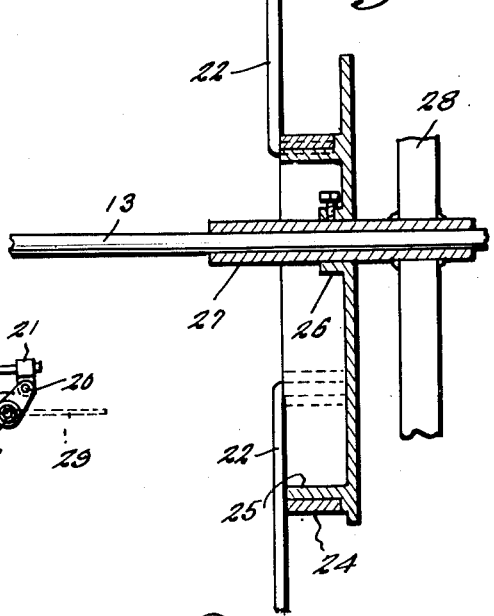
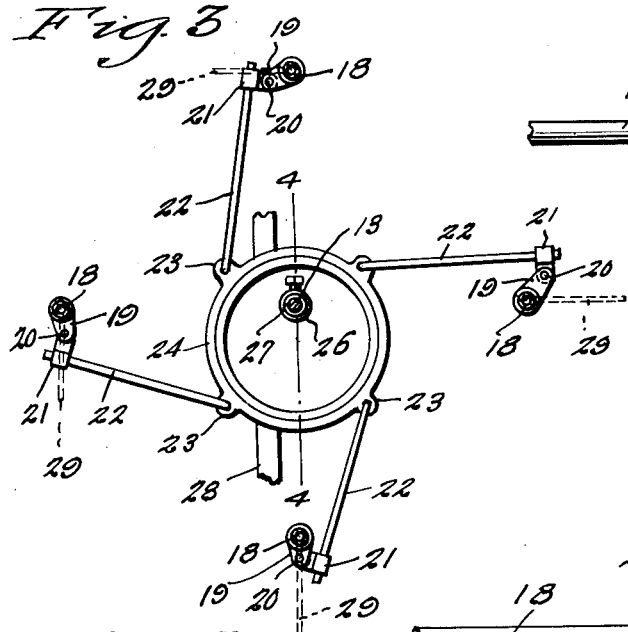
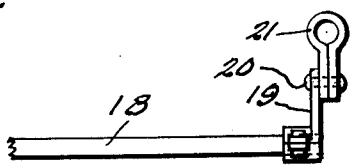
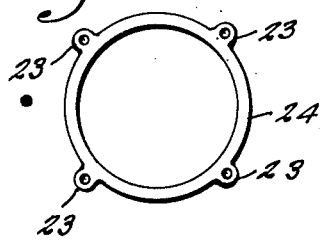
Inventor
Elmer G. Blackledge
By Clarence A. O'Brien
and Harvey B. Jacobson
Attorneys Patented Sept. 7, 1943

2,328,605

UNITED STATES PATENT OFFICE 2,328,605

HARVESTER

Elmer G. Blackledge, Oswego, Kans.

Original application August 22, 1939, Serial No. 291,439. Divided and this application March 20, 1942, Serial No. 435,550

1 Claim. (Cl. 56—226)

This invention relates to new and useful improvements in harvesters, and is a division of my copending application Serial No. 291,439, filed August 22, 1939.

The principal object of the present invention is to provide a harvester in which the parts thereof are constructed to permit a wide range of adjustability and adaptability to conditions under which the machine must operate.

Another important object of the invention is to provide a harvesting machine which is positive acting in operation and not susceptible to the ready development of defects.

These and other important objects and advantages of the invention will become apparent to the reader of the following description.

In the drawings:

Figure 1 is a top plan view of the harvester.

Figure 2 is a cross-sectional view taken substantially on line 2—2 of Figure 1.

Figure 3 is a sectional view taken substantially on the line 3—3 of Figure 1.

Figure 4 is a fragmentary detailed sectional view taken substantially on the line 4—4 of Figure 3.

Figure 5 is a side elevational view of the connecting rod attaching band shown in Figure 3.

Figure 6 is an elevational view showing one of the screen carrying shafts.

Figure 7 is a perspective view of one of the material handling finger assemblies.

Figure 8 is a sectional view taken substantially on the line 8—8 of Figure 1.

Figure 9 is a perspective view of one of the grain saving screens of the reel.

Figure 10 is a sectional view taken substantially on the line 10—10 of Figure 7.

Referring to the drawings wherein like numerals designate like parts, it can be seen that numeral 5 generally refers to the agricultural machine which is of general conventional design. The machine includes the frame 6 for the horizontal conveyor 7 and elevating conveyor 8. Along the front edge of this frame 6 are the sickle bar guard teeth 9 of any desired construction. Numerals 10—10 represent the side runners which are at the ends of the sickle assembly generally referred to by numeral 11.

Mounted over the sickle assembly 11 is the reel assembly generally referred to by numeral 12 and which is of novel construction. This assembly 12 includes the shaft 13 which is journaled through suitable bearings on the machine and which is driven by the drive chain 14.

Radially extending arms 15 extend laterally from the shaft 13 and are bridged by the bars 16.

Each of these bars 16 carries bearings 17—17 through which a corresponding finger carrying shaft 18 is journaled. One end of each of these shafts 17 has an arm 19 extending laterally therefrom and pivotally connected as at 20 to a collar 21 which is clamped to a corresponding connecting rod 22 at the outer end of the latter. The inner ends of these connecting rods 22 are laterally disposed and protrude through eyes 23 on the band 24 which circumscribes the drum 25. This drum 25 has an eccentrically disposed hub 26 located along the collar 27 through which the shaft 13 of the reel assembly is disposed. The sleeve 27 is fixed to the post 28 of the machine so as to be immovable.

Fingers 29 extend laterally from each shaft 18 and as the reel rotates these shafts 18 and the fingers 29 feather due to the camming effect of the band 24 due to the eccentric mounting of the drum 25.

Elongated screens consisting of rectangular frames 31 and mesh fillers 32 are suitably secured to the arms 15 and these screens catch grains and drop the same onto the conveyor 7. It can be seen that lugs 33 on the shafts 18 prevent any feathering action of the shafts 18 until the fingers 29 start to move across the conveyor 7.

It is to be understood that the elongated screens serve to prevent crooked heads of grain from hooking over the reel bats where they are carried up into the wind and blown, some of the same escaping the conveyor.

Under the conveyor frame 6 is the shaft 34 journaled through bearings 35. Each clamp unit 45 has a V-shaped tine structure projecting therefrom, as in the manner shown in Figure 2.

While the foregoing specification sets forth the invention in specific terms, it is to be understood that numerous changes in the shape, size and materials may be resorted to without departing from the spirit and scope of the invention is claimed hereinafter.

Having described the invention, what is claimed as new is:

In a harvesting machine, a reel, said reel comprising a rotary structure provided with radially disposed arms at the end thereof, grain catching panels extending longitudinally of the rotary structure and bridging corresponding arms, said panels being secured to the arms inwardly of the outer ends thereof, a shaft for each pair of corresponding arms, bearing means on the arms for the shaft, said shaft being provided with outstanding fingers.

ELMER G. BLACKLEDGE.